United States Patent [19]

Berman

[11] 4,129,203
[45] Dec. 12, 1978

[54] ROADWAY VEHICLE

[76] Inventor: Nelson Berman, 1006 Iliff St., Pacific Palisades, Calif. 90272

[21] Appl. No.: 805,962

[22] Filed: Jun. 13, 1977

[51] Int. Cl.² .............................................. B60L 5/40
[52] U.S. Cl. .................................... 191/48; 104/145; 104/244.1; 180/2 R; 191/4; 191/22 C
[58] Field of Search ............ 104/139, 140, 149, 244.1, 104/145–147, 148 R; 180/2, 98, 79, 131, 65 R, 65 D; 191/1 R, 4, 22 C, 48, 57, 59.1, 60.2, 60.3, 2, 3, 22 R, 29 R, 45 R, 45 A, 49, 50, 59, 85, 90

[56] References Cited

U.S. PATENT DOCUMENTS

| 729,137 | 5/1903 | Connett | 191/48 |
| 1,519,887 | 12/1924 | Uffert | 191/48 |
| 2,631,853 | 3/1953 | Haynes et al. | 104/140 X |
| 3,581,838 | 6/1971 | Rhodes | 104/244.1 X |
| 3,587,470 | 6/1971 | Wilson | 104/149 |
| 3,730,311 | 5/1973 | Maison | 191/59.1 X |
| 3,765,501 | 10/1973 | Burvee | 180/131 |
| 3,786,762 | 1/1974 | Corkum et al. | 191/59.1 X |
| 3,914,562 | 10/1975 | Bolger | 191/4 X |

Primary Examiner—Stephen G. Kunin

[57] ABSTRACT

Apparatus and a system are provided for a trackless-roadway vehicle having internal and external propulsion energy sources; the external energy being obtained by a collector plow from electric power rails located in a conduit below the roadway. The collector plow, sensors, the plow elevating mechanism, and the plow steering mechanism are mounted on a laterally movable carriage on the underside of the vehicle. By means of servo-systems comprised of sensors, servo-amplifiers, and drive motors with associated gearing, the plow is automatically and continuously translated and orientated to maintain the plow arms in the vertical plane of the slot in the cover of the conduit. The plow consists of two arms, each with a contactor. When the plow is out of the conduit, the contactors lie in a single plane so that they may pass through the slot. After passing through the slot the contactors are brought to bear on the power rails by contra-rotation of the plow arms. Switching and relay means are employed to transfer the propulsion motor between the external and internal sources, to effect recharging of the internal source, and to control the limits of the horizontal and vertical travel of the plow.

10 Claims, 12 Drawing Figures

ROADWAY VEHICLE

BACKGROUND OF THE INVENTION

1. Field of the Invention

The substitution of other types of vehicles for internal combustion engine driven vehicles is today recognized as being desirable for both energy conservation and environmental reasons. The development and use of noninternal combustion trackless-roadway vehicles with an on-board energy supply has been inhibited by the lack of high capacity, lightweight, compact energy sources. Electric vehicles using external energy lack the internal combustion vehicles' mobility, the ability to go anywhere. This invention describes means for using either an internal source of energy or an external underground source of electricity as circumstances warrant. More particularly, this invention describes means applicable to roadway vehicles for:
   a. Automatically engaging and disengaging energy collecting contactors from underground power rails while the vehicle is in motion or is stationary.
   b. Maintaining contact with the power rails in spite of deviations in the path of the vehicle from the line of the power rails.
   c. Automatic switching between the internal and the external energy sources as required or desired.

2. Description of the Prior Art

Trackless-roadway electric vehicles capable of operating from batteries or from an external source disclosed in prior art include:
   a. U.S. Pat. No. 3,547,237 describes a remotely controlled pickup for trackless electric vehicles operating from overhead power lines. The undesirable appearance and the safety problems inherent in overhead power lines are not presented by the underground power lines of the present invention.
   b. U.S. Pat. No. 3,637,956 describes a vehicle that operates from batteries or from power lines located on the surface of the road. The problems involved with power lines on the road surface relating to safety, vulnerability to weather conditions, and maintenance required are solved in the present invention by having the power lines underground.
   c. U.S. Pat. No. 3,914,562 and U.S. Pat. No. 4,007,817 describe a vehicle and roadway, respectively, embodying means for inductively coupling power to the vehicle from power lines beneath the roadway surface. The transmission of power from a one-turn primary by induction across an air gap (between the magnetic circuit of the vehicle and the magnetic circuit of the roadway) is inefficient due to low flux density and large leakage reactance. In the present invention the use of direct contact to the power rails results in low power loss in transfering power from the source to the vehicle.

SUMMARY OF THE INVENTION

The object of this invention is to provide means enabling a roadway vehicle to operate from either an on-board energy source or from an external source by means of a plow contacting the source located below the surface of the roadway. The transfer from one source to the other may be made while the vehicle is moving or stationary.

The power collector used with the external source is mounted on the underside of the vehicle. External power is taken from rails located in a conduit having a slotted steel cover. The vehicle has contactors which may be extended through the slot to make contacts with the rails. The parts of the collector which go into the slot are called the "plow". The plow is mounted on a plow steering table which is attached to and is horizontally rotatable with respect to a carriage which can be moved from side to side with respect to the vehicle. The axis of rotation of the plow steering table is near its forward end and is located at the intersection of the longitudinal centerline of the movable carriage with the centerline between two magnetometers mounted on the carriage, one on each side of and each equidistant from the longitudinal centerline of the carriage. Mounted on the plow steering table near its rearward end are two magnetometers one on each side of and equidistant from the logitudinal centerline through the plow arms and the axis of rotation of the plow steering table. When the vehicle is in the proximity of the steel cover over the power rails each magnetometer of the pair on the carriage produces an output signal which is proportional to its distance from the metal cover, i.e. the slot. The two signals are fed into a null-type servo-amplifier which controls the servo-motor which moves the carriage. When the axis of rotation of the plow steering table is directly over the slot the two carriage magnetometer outputs are equal. The servo-system is so designed that it continuously automatically positions that axis over the slot as the vehicle moves from side to side within the driving lane. In a similar fashion the two magnetometers mounted on each side of the plow on the plow steering table act in conjunction with another servo-amplifier, the plow steering motor and the plow steering mechanism to angularly orient the plow in the vertical plane of the slot.

When the plow is properly located and orientated over the slot the plow may be lowered (by a motor) into the slot to make contacts with the power rails. After contacts are made the propulsion power is taken from the external source and the internal source is placed on charge.

If the centerline of the vehicle moves more than some predetermined distance from the slot the movable carriage will trip a limit switch which will activate the elevation motor to raise the plow out of the slot; then, with only a momentary loss of power, propulsion will be switched to the internal source. The plow will be raised and power will be taken from the internal source whenever there is a loss of external power; whether by accident, by choice, or by design.

While in the preferred embodiment of the invention the internal source is an electric battery, other sources of stored energy can be used. For example, a hydrox fuel cell can be placed "on charge" by renewing its supply of hydrogen and oxygen by the electrolysis of water. Similarly, the energy of hybrid, chemical closed cycle, and flywheel sources can be renewed by electricity from the external source.

DESCRIPTION OF THE PREFERRED EMBODIMENT

Figure 2:
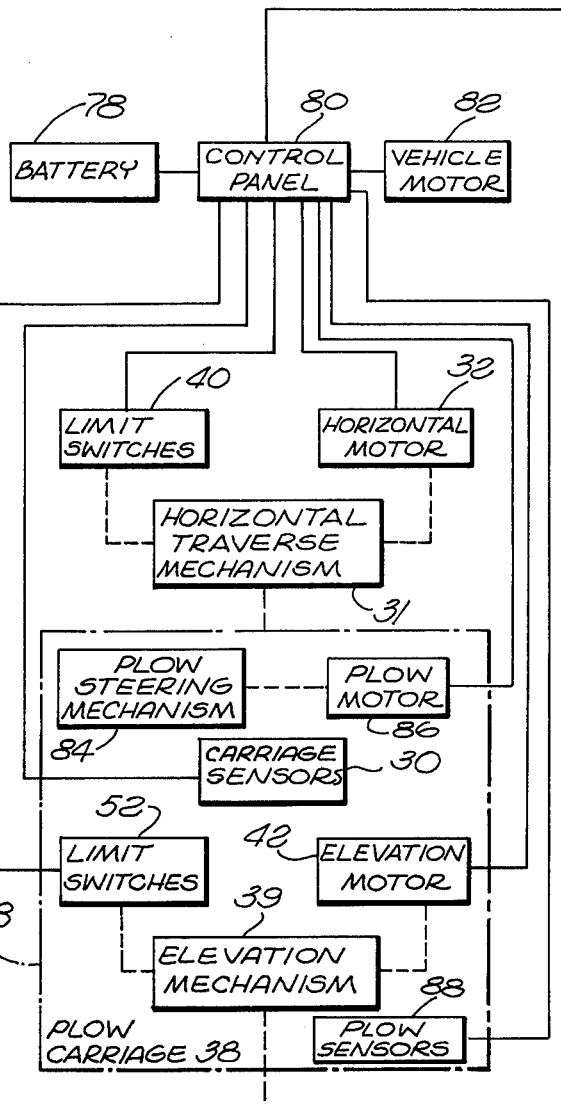
FIG. 2 is a schematic block diagram of the preferred embodiment. Also shown in FIG. 2 is the plow in the conduit with its contactors in position to take power from the rails.
Figure 2:
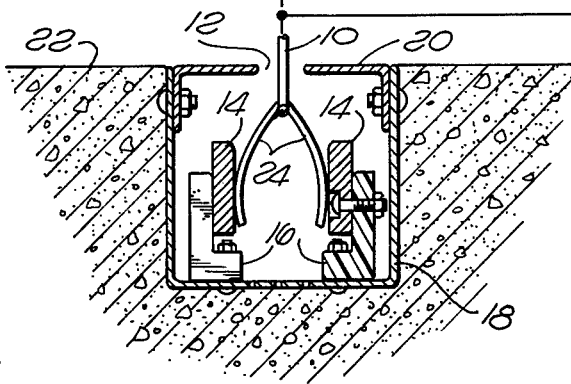

In the preferred embodiment the internal source of propulsion power is a secondary type of electric battery, and the external source is a pair of power rails in a conduit below the surface of the roadway. The power rails are supplied with electricity by the usual distribution system from a central power station. Referring to FIG. 2, external power is supplied to the vehicle by means of a collector plow 10 which, lowered through slot 12, makes contact with the power rails 14. The power rails are mounted on insulators 16 in the conduit 18. The coverplates 20 of the conduit can be removed for repairs or maintenance without disturbing the pavement 22. The resilient metallic contactors 24 make firm contacts with the rails.

Figure 1A:
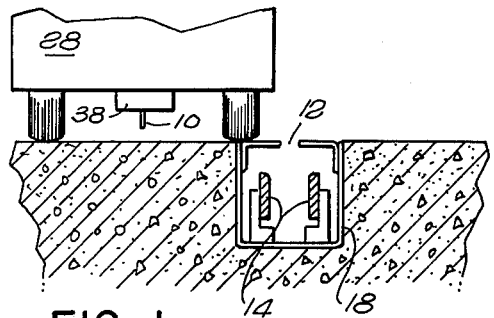
FIGS. 1A-1C illustrate the action of the movable carriage and plow on the underside of the vehicle.
Figure 1B:
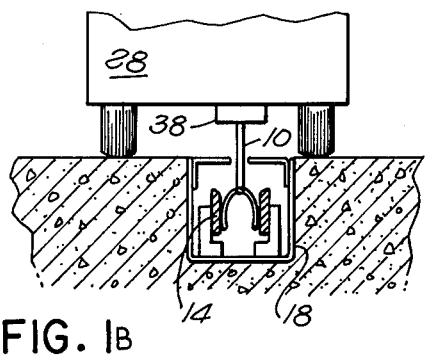
Figure 1C:
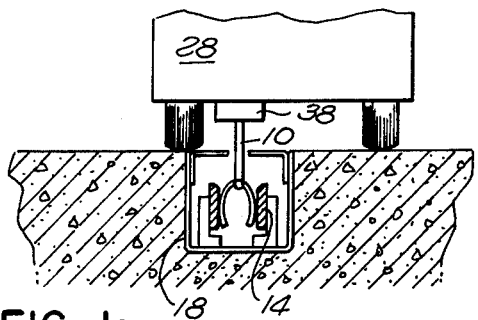
Figure 8:
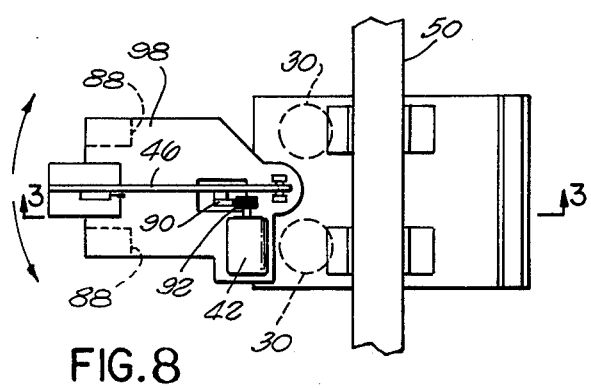
FIG. 8 is a plan view of the movable plow carriage and the rotatable plow steering table.

The operation of the invention is illustrated in FIGS. 1A-1C. The collector plow 10 is attached at the centerline of the carriage 38 which is laterally movable with respect to the vehicle 28. The carriage moves on a beam mounted on the underside of the vehicle. When the conduit 18 is between the wheels of the vehicle the carriage moves as is required to keep the plow centered with the slot 12, and the plow is lowered to make contacts with the power rails 14. When the conduit is not between the wheels of the vehicle, FIG. 1A, the plow is raised and the carriage is centered with respect to the vehicle. When the contactors 24 are not in contact with the rails the vehicle operates on battery power.

Figure 3:
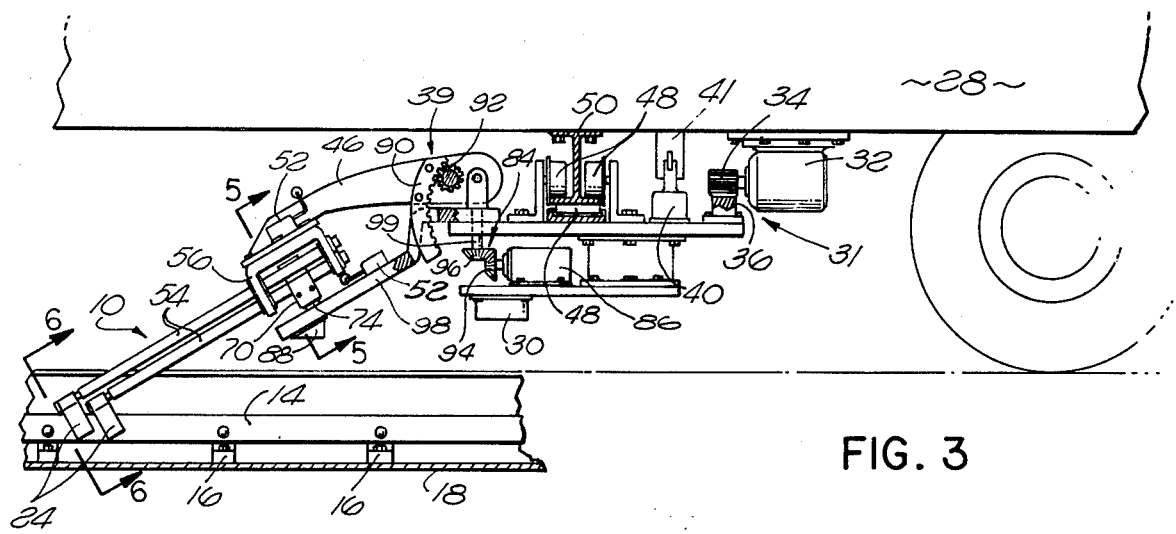
FIG. 3 shows, in a section on 3—3 of FIG. 8, the arrangement of mechanical components in the preferred embodiment.

Referring to FIGS. 2 and 3, the plow steering table 98, which carries the plow 10, is mounted on the plow carriage 38 and is rotatable with respect to the carriage; the axis of rotation being the centerline of shaft 99. The carriage sensors 30 produce electrical signals which by phase and magnitude indicate the direction and distance of the axis of rotation of the plow steering table 98 from the conduit slot. The sensors 30 may be a pair of magnetometers mounted on the carriage 38, one on each side of and equidistant from the centerline of the carriage, and on the line perpendicular to the carriage centerline passing through the plow steering table axis. The magnetometers sense the magnetic field distortion created by the steel coverplates 20 of the conduit. The sensor signals are fed into a servo-amplifier located in the control panel 80. The output of the amplifier drives the horizontal motor 32 in the direction needed to bring the sensors equidistant from the slot. The horizontal motor 32 is mounted on the vehicle 28. By means of the horizontal traverse mechanism 31, comprised of the pinion gear 34 and the rack 36, the plow carriage 38 is driven by the motor 32 within the preset limits controlled by limit switches 40 and actuators 41.

The carriage 38 is supported by roller bearings 48 on the beam 50 which is attached to the vehicle 28. The sensors 30, the plow steering table 98, the plow motor 86, the plow steering mechanism comprised of the bevel gears 94 and 96 and the shaft 99 are mounted on the plow carriage 38. The elevation motor 42, the elevation mechanism 39 comprised of the gear 92, the quadrant rack 90, and the arm 46, the plow sensors 88, the wedge 74, the limit switches 52, and the plow 10 are mounted on the plow steering table 98. The shaft 99 about which the plow steering table 98 rotates is rigidly attached to the table and to the gear 96.

The plow sensors 88, mounted near the rearward end and beneath the plow steering table 98, one on each side of and equidistant from the plow 10, produce input electrical signals for a servo-amplifier which controls the plow motor 86. The motor drives the plow steering mechanism 84 to orient the plow steering table 98 to the position where the plow sensors 88 are each equidistant from the conduit slot. When the plow sensors 88 and the carriage sensors 30 are respectively located in the equidistant positions the plow 10 lies in the vertical plane of the conduit slot regardless of the position and orientation of the vehicle in the driving lane of the roadway.

Relay means located in the control panel 80 operate to control the elevation motor 42 so that the plow is lowered when it is over the slot. The relay means operate to lower or raise the plow in response to signals from the sensor 30, manually operated switches, the elevation limit switches 52, and the horizontal limit switches 40 in accordance with predetermined logical requirements, in the manner well known in the art.

Figure 4:
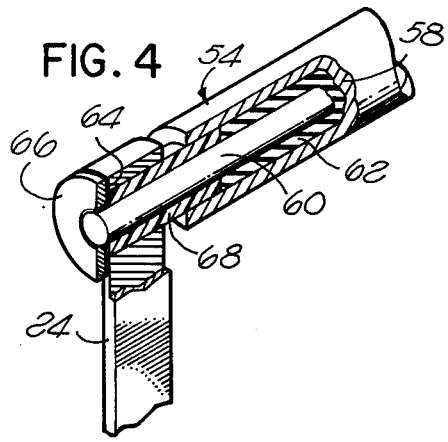
FIG. 4 is a perspective view, partly in cross-section, of the contactor end of a plow arm.
Figure 5A:
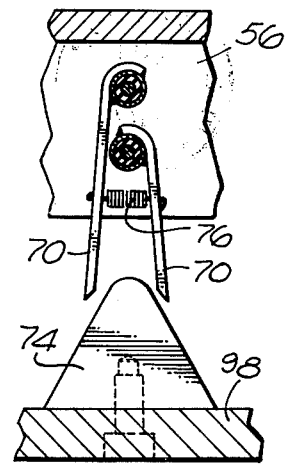
FIGS. 5A-5B show sections on 5—5 of FIG. 3; 5A with the plow in the raised position, 5B with the plow in the lowered position.
Figure 5B:
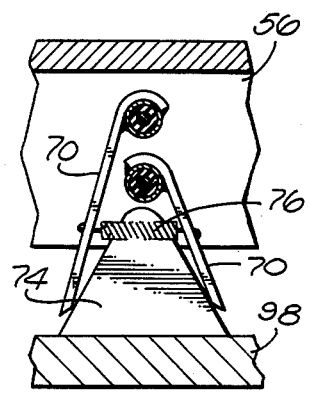
Figure 7:
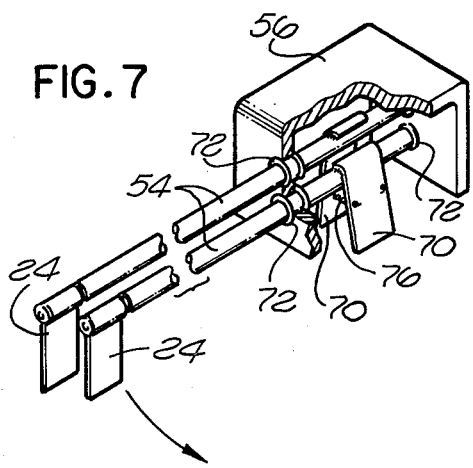
FIG. 7 is a perspective view partly broken away of the plow and bracket assembly showing the relationship between the contactors and the spring-loaded legs.
Figure 6A:
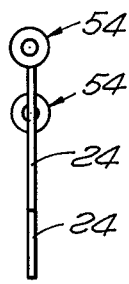
FIGS. 6A-6B show sections on 6—6 of FIG. 3; 6A with the plow in the raised position, 6B with the plow in the lowered position.
Figure 6B:
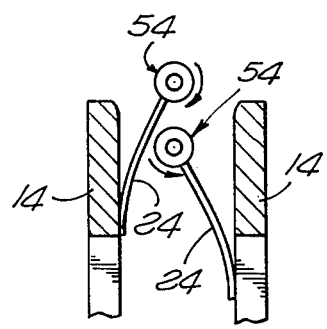

The elevation motor controls the plow movement by actuating the elevation mechanism 39. The plow is comprised of two plow arms 54 and the plow arm bracket 56. The plow arm 54, FIG. 4, is constructed of a steel tube 58, within which is the electrical conductor 60. The conductor is separated from the steel tube by insulation 62 and is connected at one end to the contactor 24 by means of solder 64 and the metal end cap 66. A high strength plastic 68 provides an insulated mechanical bond between the contactor and the steel tube. As shown in FIG. 7, near the opposite end of the plow arm a leg 70 is attached to the tube 58.

The two plow arms are held in the plow arm bracket 56, as shown in FIG. 7, by grommets 72 so that they are free to turn. As illustrated in FIGS. 5A, 5B and 6A, 6B when the plow is out of the slot 12 the two contactors 24 are in the same plane, and upon lowering of the plow they can pass into the slot. After the contactors are through the slot further lowering of the plow brings the legs 70 into contact with the wedge 74, which is mounted on the plow steering table 98, thus spreading the legs, thereby rotating the arms 54 and bringing the contactors 24 resiliently up against the rails 14. When the plow is raised the springs 76 act to rotate the plow back to the position where the contactors are in the same plane to enable them to pass out of the slot.

The control panel 80, FIG. 2, also contains manual switches, visual indicators, battery charging equipment and means necessary for controlling the vehicle propulsion motor 82 and for switching between the battery 78 and the external energy source.

The invention is not to be construed as limited to the particular forms disclosed herein, since these are to be regarded as illustrative rather than restrictive.

I claim:

1. A roadway vehicle having:

a. an internal and an external source of propulsion energy, the latter located in a conduit below the surface of the roadway; said conduit having a slotted cover, and said external energy source being recessed out of the vertical plane of the slot.

b. a plow with elements for conducting energy to the vehicle and for contacting the external source through a slot in the conduit;

c. means for lowering the plow into the slot in the conduit and for raising the plow out of the slot;

d. means for positioning the plow relative to the external energy source to permit engagement of same outside of the vertical plane of the slot, and means for effecting engagement and disengagement between the conducting elements of the plow and the external energy source.

2. A vehicle as described in claim 1 having sensor means for determining the lateral position and angular orientation of the plow with respect to the conduit slot.

3. A vehicle as described in claim 2 having dirigible means for changing the lateral position and angular orientation of the plow with respect to the conduit slot.

4. A vehicle as described in claim 3 having the sensor means coacting with the means for laterally positioning and angularly orienting the plow whereby the plow is automatically made to lie in the vertical plane of the conduit slot.

5. A vehicle as described in claim 4 having the sensor means, the plow, the plow elevation means, and the plow angular orientation means mounted on a laterally movable carriage located on the underside of the vehicle, and having means for moving the carriage laterally, whereby the plow is automatically made to lie in the vertical plane of the conduit slot.

6. A vehicle as described in claim 4 having switching means controlling the elevation of the plow, whereby it is automatically raised or lowered upon the occurrance of preselected conditions.

7. A vehicle as described in claim 1 having switching means and recharging means, whereby the internal energy source is replenished by the external source.

8. For the vehicle described in claim 1, a conduit plow having:

a. a plow arm with a planar contactor;

b. means for holding the plow arm and the plane of the contactor in the vertical plane of the conduit slot so that the plow can be lowered into the conduit slot;

c. means for rotating the plow arm about its longitudinal axis after the contactor is in the conduit, whereby the contactor is held against the power rail in the conduit;

d. means for rotating the plow arm back to its original position so that the plow may pass out of the conduit slot.

9. A vehicle as described in claim 1 wherin the internal energy source is a secondary type electric battery.

10. A roadway vehicle having a plow with elements for conducting energy to the vehicle and for contacting an external source of propulsion energy located in a slotted conduit below the surface of the roadway, which vehicle is not mechanically guided by elements associated with the roadway while contacting the external source.

* * * * *